United States Patent
Farcas et al.

(10) Patent No.: US 8,360,496 B2
(45) Date of Patent: Jan. 29, 2013

(54) FOLDING SEAT SYSTEM

(75) Inventors: Cristian Farcas, Royal Oak, MI (US); Chris Piscitelli, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 296 days.

(21) Appl. No.: 12/765,568

(22) Filed: Apr. 22, 2010

(65) Prior Publication Data

US 2011/0260490 A1   Oct. 27, 2011

(51) Int. Cl.
B60N 2/14   (2006.01)
(52) U.S. Cl. .................. 296/65.09; 297/327; 297/333; 297/378.13
(58) Field of Classification Search ............ 296/65.01, 296/65.05, 65.08, 65.09, 65.16, 65.18; 297/15, 297/311, 313, 325, 326, 327, 328, 331, 332, 297/333, 334, 335, 344.1, 344.15, 378.13
See application file for complete search history.

(56) References Cited

U.S. PATENT DOCUMENTS

| | | | |
|---|---|---|---|
| 4,194,782 A * | 3/1980 | Itoh .................. 296/64 |
| 4,771,507 A * | 9/1988 | Draplin et al. ............ 16/297 |
| 5,269,581 A * | 12/1993 | Odagaki et al. ............ 296/66 |
| 5,868,451 A * | 2/1999 | Uno et al. ............ 296/66 |
| 6,135,555 A | 10/2000 | Liu et al. |
| 6,231,101 B1 * | 5/2001 | Kamida et al. ............ 296/63 |
| 6,416,107 B1 * | 7/2002 | Kanaguchi et al. ....... 296/65.09 |
| 6,435,589 B2 * | 8/2002 | Shimizu et al. .......... 296/65.09 |
| 6,619,723 B2 * | 9/2003 | Duffy ................. 296/146.11 |
| 6,682,120 B2 * | 1/2004 | Kamida et al. ............ 296/65.09 |
| 6,705,658 B2 * | 3/2004 | Jach et al. ............ 296/65.09 |
| 6,709,040 B1 * | 3/2004 | Drew et al. ............ 296/66 |
| 6,793,265 B2 * | 9/2004 | Kamida et al. ............ 296/64 |
| 6,820,913 B2 * | 11/2004 | Macey et al. ............ 296/65.13 |
| 6,837,530 B2 * | 1/2005 | Rudberg et al. ........... 296/65.09 |
| 6,869,138 B2 * | 3/2005 | Rhodes et al. ............ 297/15 |
| 6,896,309 B2 * | 5/2005 | Satoh et al. ............ 296/65.09 |
| 6,988,768 B2 * | 1/2006 | Kutomi et al. ............ 297/15 |
| 7,040,685 B2 * | 5/2006 | Sumida et al. ............ 296/69 |
| RE39,315 E * | 10/2006 | Kamida et al. ............ 296/63 |
| 7,128,358 B2 | 10/2006 | Perin |
| 7,192,088 B1 * | 3/2007 | Trombley et al. ......... 297/335 |
| 7,241,092 B2 * | 7/2007 | Lim ................. 410/94 |
| 7,252,320 B2 * | 8/2007 | Tsujibayashi et al. ..... 296/65.09 |
| 7,255,384 B2 | 8/2007 | Saberan et al. |
| 7,374,222 B2 * | 5/2008 | McLaughlin et al. ..... 296/65.09 |
| 7,377,582 B2 | 5/2008 | Fukada et al. |

(Continued)

FOREIGN PATENT DOCUMENTS

JP   04039178 A   *   2/1992

*Primary Examiner* — Glenn Dayoan
*Assistant Examiner* — Paul Chenevert
(74) *Attorney, Agent, or Firm* — Ingrassia Fisher & Lorenz, P.C.

(57) ABSTRACT

A folding seat system for use with a vehicle includes, but is not limited to, a seat body including a seat bottom and a seat back. The seat back is rotatably mounted to the seat bottom such that the seat back can be folded over the seat bottom. A hinge is connected to the seat body and is configured to attach to the vehicle. The hinge is further configured to permit the seat body to rotate approximately 180° in a longitudinal direction of the vehicle between a forward position, an intermediate position, and a storage position when the seat back is folded over the seat bottom. A biasing member biases the seat body towards the storage position when the seat body is in the forward position.

19 Claims, 7 Drawing Sheets

U.S. PATENT DOCUMENTS

| | | |
|---|---|---|
| 7,413,251 B2 | 8/2008 | Link |
| 7,431,372 B2 * | 10/2008 | Imamura et al. ........... 296/65.09 |
| 7,494,184 B2 | 2/2009 | Lehr et al. |
| 7,497,511 B2 | 3/2009 | Park et al. |
| 7,506,931 B2 | 3/2009 | Christopher et al. |
| 7,537,260 B2 * | 5/2009 | Epaud ........................ 296/65.09 |
| 7,559,594 B2 | 7/2009 | McMillen |
| 7,600,801 B2 | 10/2009 | Lehy et al. |
| 7,611,200 B2 | 11/2009 | Jovicevic et al. |
| 7,931,338 B2 * | 4/2011 | Lindsay ................... 297/378.13 |
| 8,109,555 B2 * | 2/2012 | Devoss et al. .............. 296/65.08 |
| 2002/0047287 A1 * | 4/2002 | Kawasaki ....................... 296/64 |
| 2003/0193206 A1 * | 10/2003 | Kutomi et al. .................. 296/66 |
| 2007/0085368 A1 * | 4/2007 | Hirokawa et al. .......... 296/65.16 |
| 2011/0012416 A1 * | 1/2011 | Sayama ................... 297/378.13 |
| 2011/0080029 A1 * | 4/2011 | Shimizu ........................ 297/334 |

\* cited by examiner

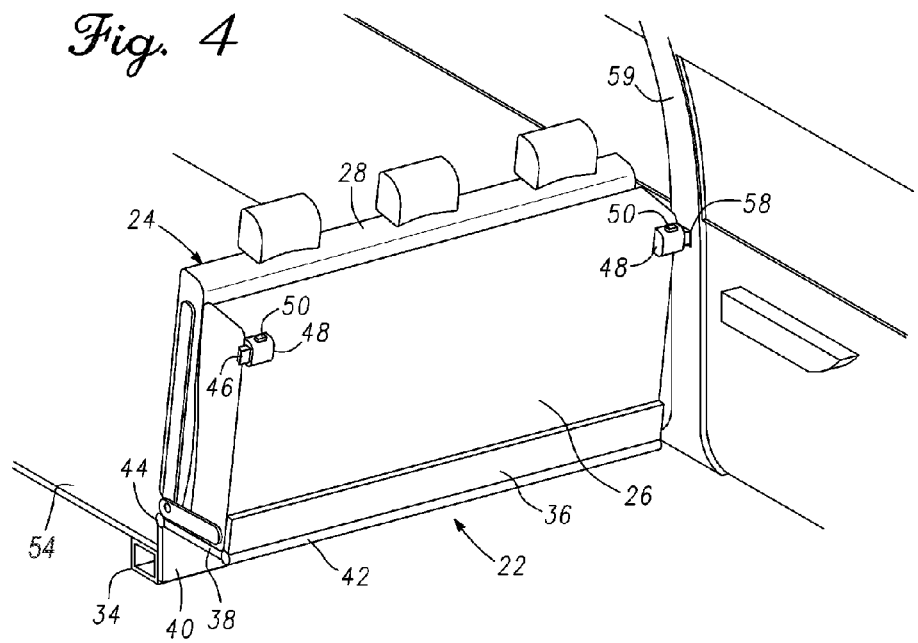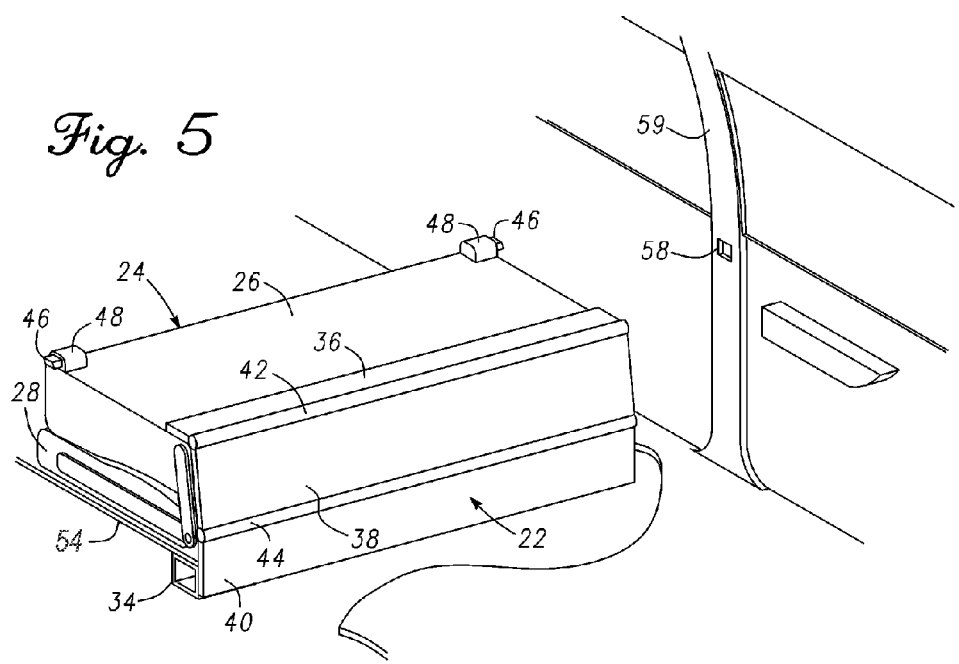

US 8,360,496 B2

FOLDING SEAT SYSTEM

TECHNICAL FIELD

The technical field generally relates to a seat, and more particularly relates to a folding seat system.

BACKGROUND

Various economic circumstances and environmental conditions have increasingly motivated car buyers to buy smaller, more affordable and environmentally conscientious vehicles. Smaller vehicles conventionally have relatively small cargo compartments, as compared with larger vehicles. However, the buyers of these smaller vehicles may still need to transport large cargo items, either routinely or occasionally. For example, a buyer of a small car may need to transport items such as furniture, athletic equipment, art work, and other tall and/or bulky items. Such items will typically not fit within the trunk or other cargo compartments of a small car.

One solution frequently employed by the owners of such vehicles is to attempt to store such large cargo items in a second row or third row passenger seating area. However, this solution may be undesirable because the passenger seats may obstruct much of the storage space available in the second and third rows, thus making the storage of bulky cargo items at that location either infeasible or undesirable or both. Additionally, some cargo items may be unclean or may otherwise pose a risk of dirtying, marking, staining, and/or damaging the seats in the second row or third row passenger seating areas.

Another solution sometimes employed by the owners of such vehicles may involve depositing the cargo in the cargo compartment and leaving the trunk or hatch in an open state in a manner that permits the cargo item to protrude from the enclosure of the vehicle. This solution is undesirable because the cargo may fall out of the cargo compartment during transport. This solution may also be undesirable because leaving the trunk or hatch open may obstruct the driver's rear view.

SUMMARY

Various embodiments of a folding seat system for use with a vehicle are disclosed herein.

In an embodiment, the folding seat system includes, but is not limited to, a seat body that includes a seat bottom and a seat back. The seat back is rotatably mounted to the seat bottom such that the seat back can be folded over the seat bottom. A hinge is connected to the seat body and configured to be attached to the vehicle. The hinge is further configured to permit the seat body to rotate between a forward position and a storage position when the seat back is folded over the seat bottom and when the hinge is attached to the vehicle. The rotation is approximately one hundred and eighty degrees in a longitudinal direction of the vehicle. A biasing member is arranged to act on one of the seat body and the hinge. The biasing member is configured to bias the seat body towards the storage position when the seat body is in the forward position.

In an embodiment, the folding seat system includes, but is not limited to, a seat body that includes a seat bottom and a seat back. The seat back is rotatably mounted to the seat bottom such that the seat back can be folded over the seat bottom. A hinge is connected to the seat body and configured to be attached to the vehicle. The hinge is further configured to permit the seat body to rotate between a forward position and a storage position when the seat back is folded over the seat bottom and when the hinge is attached to the vehicle. The rotation is approximately one hundred and eighty degrees in a longitudinal direction of the vehicle. A biasing member is arranged to act on one of the seat body and the hinge. The biasing member is configured to bias the seat body towards the storage position when the seat body is in the forward position. The seat body is further configured to be selectively secured in an intermediate position between the forward position and the storage position, the intermediate position being generally upright.

In another embodiment, a vehicle equipped with the folding seat system includes, but is not limited to, a support body. A seat body includes a seat bottom and a seat back. The seat back is rotatably mounted to the seat bottom such that the seat back can be folded over the seat bottom. A hinge is attached to the support body and to the seat body. The hinge is configured to permit the seat body to rotate between a forward position and a storage position when the seat back is folded over the seat bottom. Such rotation is approximately one hundred and eighty degrees in a longitudinal direction of the vehicle. A biasing member is arranged to act on one of the seat body and the hinge. The biasing member is configured to bias the seat body towards the storage position when the seat body is in the forward position.

DESCRIPTION OF THE DRAWINGS

One or more embodiments will hereinafter be described in conjunction with the following drawing figures, wherein like numerals denote like elements.

FIG. 4 is a simplified fragmentary perspective view of the interior of the vehicle of FIG. 1 illustrating the folding seat assembly of FIG. 3 with the seat body in an intermediate position;

FIG. 5 is a simplified fragmentary perspective view of the interior of the vehicle of FIG. 1 illustrating the folding seat assembly of FIG. 4 with the seat body in a storage position;

DETAILED DESCRIPTION

The following detailed description is merely exemplary in nature and is not intended to limit application and uses. Furthermore, there is no intention to be bound by any expressed or implied theory presented in the preceding technical field, background, brief summary or the following detailed description.

An improved folding seat assembly for use with a vehicle is disclosed herein. The folding seat assembly includes a seat body having a seat bottom and a seat back. The seat back is rotatably connected to the seat bottom and may be selectively folded down over the seat bottom. The seat body is rotatably connected to the vehicle. When the seat back is in the folded position, the seat body may be rotated in a longitudinal direction with respect to the vehicle between a forward position and a storage position. The storage position is offset from the forward position by approximately one hundred and eighty degrees. In some embodiments, the seat body may be secured in an intermediate position wherein the seat body is generally upright. Rotation of the seat body from the forward position to either the intermediate position or the rearward position provides generally unobstructed cargo space between the floor and ceiling in the second row passenger area which may then receive large and/or bulky cargo items.

A further understanding of the folding seat assembly described above may be obtained through a review of the illustrations accompanying this application together with a review of the detailed description that follows.

Figure 1:
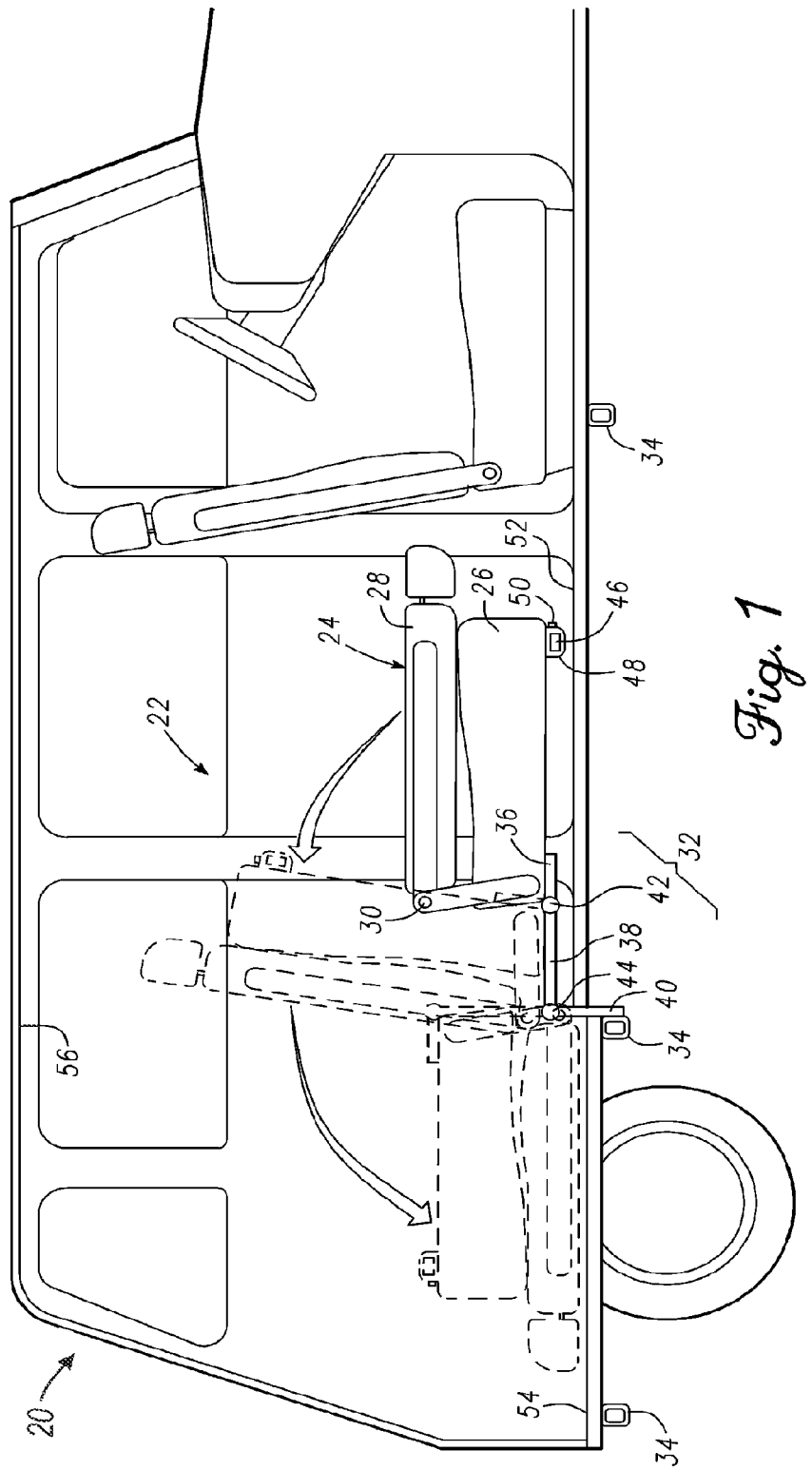
FIG. 1 is a schematic side view illustrating an interior of a vehicle equipped with an embodiment of a folding seat assembly including a seat body having a seat bottom and a rotatably attached seat back.

FIG. 1 is a schematic side view illustrating an interior of a vehicle 20 equipped with an embodiment of a folding seat assembly 22 including a seat body 24 having a seat bottom 26 and a rotatably attached seat back 28. In the illustrated embodiment, vehicle 20 is depicted as a hatch back passenger vehicle. It should be understood that folding seat assembly 22 is compatible with any type of automobile, including, but not limited to, sedans, mini-vans, full size vans, busses, wagons, light and heavy duty trucks, sport utility vehicle, crossover vehicles, and coupes. Additionally, folding seat assembly 22 may also be compatible for use with vehicles other than automobiles including, but not limited to, rail driven vehicles, watercraft, aircraft, and spacecraft.

A seat back hinge 30 rotatably connects seat back 28 to seat bottom 26 and is configured to permit seat back 28 to rotate with respect to seat bottom 26 in the direction of travel of vehicle 20, i.e., in the longitudinal direction of vehicle 20. Additional mechanisms may be included in seat body 24 that permit seat back 28 to be selectively supported at multiple angles with respect to seat bottom 26 to enable a human occupant to adjust seat back 28 to a comfortable position. Seat back hinge 30 is further configured to permit seat back 28 to assume a folded position wherein seat back 28 is folded over and onto seat bottom 26. While in this position, seat back 28 may be used to receive cargo. In some embodiments, seat body 24 may include a locking mechanism that selectively secures seat back 28 in the folded position.

In the illustrated embodiment, vehicle 20 is built on a unibody structure having a plurality of cross members 34. A hinge 32 connects folding seat assembly 22 to one of the cross members 34. Cross members 34 act as a support body for seat back hinge 30. Such attachment may be effected by a variety of mechanical means including, but not limited to, welding and the use of threaded fasteners.

In the embodiment illustrated in FIG. 1, hinge 32 is a dual pivot hinge including a first arm member 36, a second arm member 38, and a third arm member 40. Hinge 32 further includes a first pivot member 42 and a second pivot member 44. First arm member 36 is pivotably connected to second arm member 38 via first pivot member 42. Second arm member 38 is pivotably connected to third arm member 40 via second pivot member 44. Hinges of this type are available in the marketplace. One such hinge is currently manufactured by Multimatic, Incorporated dba Anton Manufacturing, Ontario, Canada and has the model number 20813842.

First arm member 36 is attached to, and supports, seat bottom 26. In other embodiments, hinge 32 may be attached to seat back 28, to seat back hinge 30, or to any other suitable part or portion of seat body 24. Second arm member 38 is attached to, and is supported by, cross member 34 via third arm 40. In other embodiments, second arm member 38 may be attached to additional or alternative components of vehicle 20 sufficiently robust to support folding seat assembly 22.

Folding seat assembly 22 further includes a latch 46 that is mounted within, and configured to protrude laterally from, a latch housing 48. Latch 46 is configured to move laterally inwardly and outwardly with respect to latch housing 48 and is biased towards an outward position. An actuator 50 is provided to allow a user to selectively move latch 46 in an inward direction.

In the embodiment illustrated in FIG. 1, latch housing 48 is mounted to an underside of seat bottom 26. In other embodiments, latch housing 48 may be mounted to any suitable surface of seat bottom 26, or to any other suitable portion of seat body 24. In still other embodiments, latch 46 may be integrated into seat bottom 26 or into seat back 28.

Latch 46 and latch housing 48 are positioned and configured to engage a latch engaging feature of vehicle 20. The latch engaging feature may comprise a striker plate mounted to an interior surface of vehicle 20 or a recess or defined in an interior surface of vehicle 20. Latch 46 and the latch engaging feature are configured to cooperate to support seat body 24 in a desired position. Vehicle 20 may include several latch engaging features that are positioned at various locations throughout the interior of vehicle 20 to support seat body 24 in different positions and/or orientations.

As illustrated in FIG. 1, a ninety degree counter-clockwise rotation (from the perspective of FIG. 1) of first arm member 36 with respect to second arm member 38 about first pivot member 42 permits seat body 24 to rotate between a forward position, illustrated in solid lines, and a generally upright intermediate position, illustrated in phantom lines. A counter-clockwise ninety degree rotation (from the perspective of FIG. 1) of second arm member 38 with respect to third arm member 40 about second pivot member 44 permits seat body 24 to move into a storage position where seat body 24 rests substantially flat on a cargo floor surface 54, as illustrated in phantom lines.

The positioning of seat body 24 in either the intermediate position or the storage position provides substantially unobstructed storage space between floor surface 52 and ceiling 56. As discussed below, hinge 32 further includes one or more biasing members that are arranged and configured to reduce the exertion needed to move seat body 24 between the forward position, the intermediate position, and the storage positions.

Figure 2:
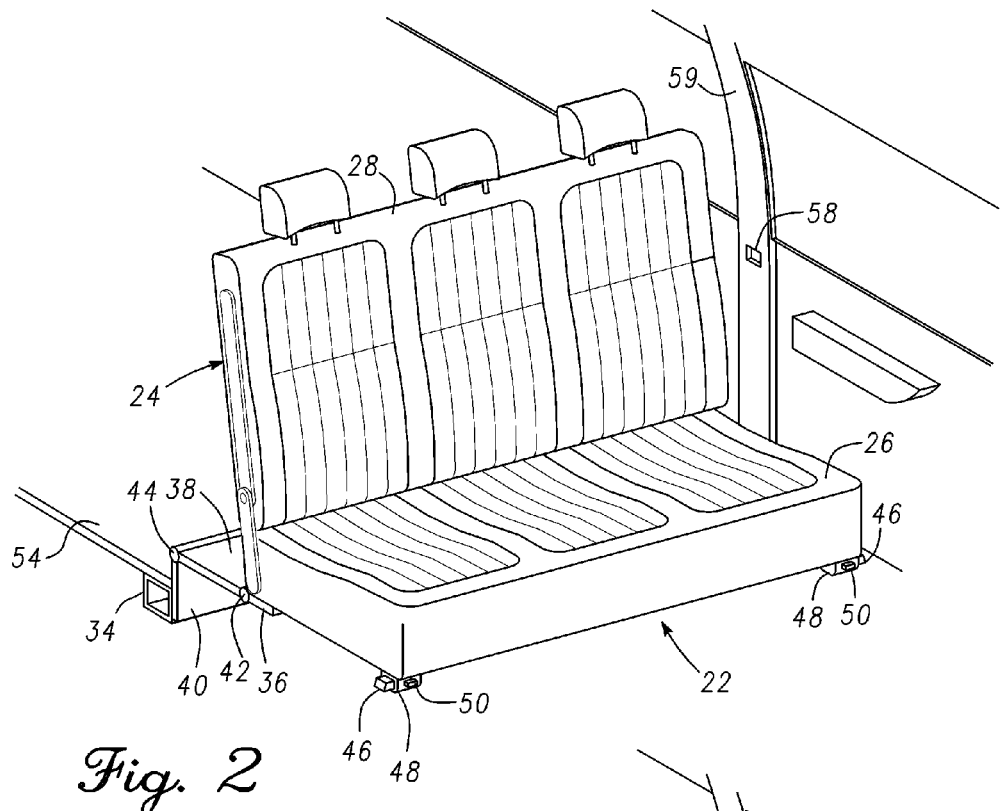
FIG. 2 is a simplified fragmentary perspective view of the interior of the vehicle of FIG. 1 illustrating the folding seat assembly of FIG. 1 with the seat body in a forward position and with the seat back in a generally upright orientation to receive passengers.

FIG. 2 is a fragmentary perspective view of the interior of vehicle 20 illustrating folding seat assembly 22 of FIG. 1 with seat body 24 in a forward position and with seat back 28 in a generally upright orientation to receive passengers. In the illustrated embodiment, seat body 24 is a bench seat including seating positions for three human occupants. In other embodiments, seat body 24 may be a bucket seat or a captain's chair or any other suitable configuration effective to provide seating surfaces for human occupants.

Folding seat assembly 22 includes two latches 46, each positioned on opposite sides of seat bottom 26. Each latch is configured to engage a respective latch engaging feature 58 of vehicle 20. In the illustrated embodiment, latch engaging feature 58 is a recess defined in a surface of a vertical column 59 of vehicle 20. In some embodiments, vertical column 59 may correspond with a vertical column of the unibody structure of vehicle 20 and may be used to mount seat belt mechanisms. In other embodiments, latch engaging feature 58 may be defined in a wall surface or other surface of the interior of vehicle 20. The latch engaging features 58 and the latches 46 cooperate to support seat body 24 in the intermediate position, as discussed below. In other embodiments, additional latch engaging features may be provided to support seat body 24 in the forward position and/or in the storage position. Such configurations may reduce or eliminate the need to equip folding seat assembly 22 with legs or other floor engaging support structures.

Figure 3:
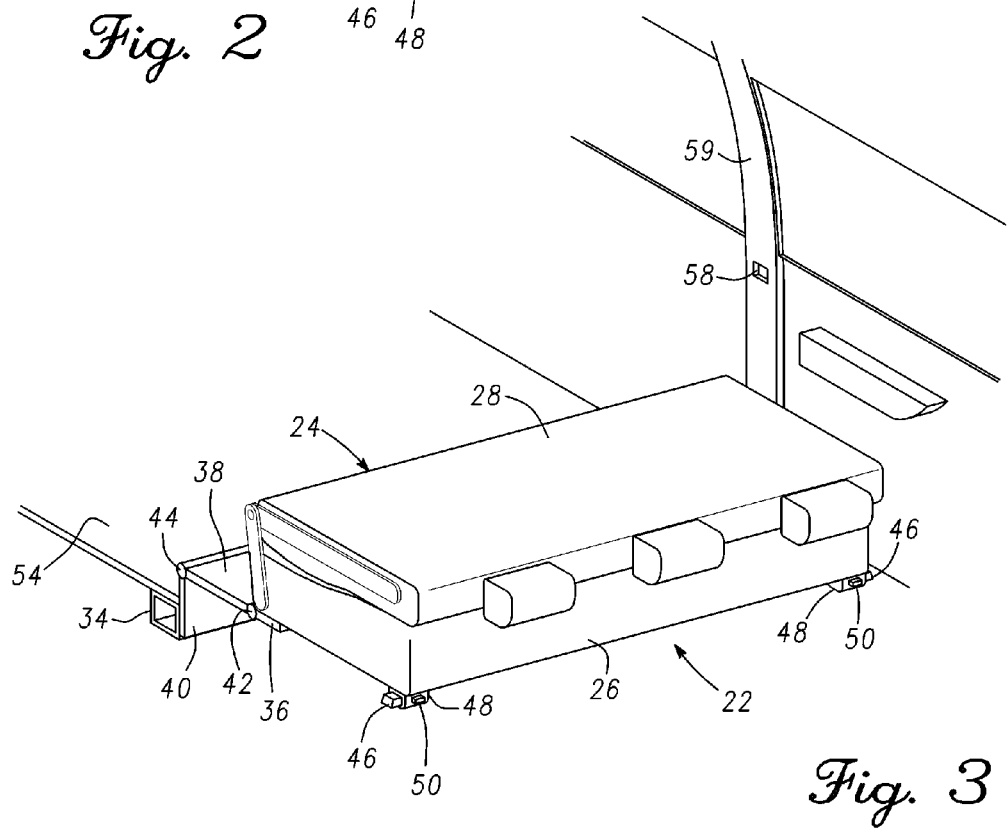
FIG. 3 is a simplified fragmentary perspective view of the interior of the vehicle of FIG. 1 illustrating the folding seat assembly of FIG. 2 with the seat body in a forward position and with the seatback folded over onto the seat bottom.

FIG. 3 is a fragmentary perspective view of the interior of vehicle 20 of FIG. 1 illustrating folding seat assembly 22 of FIG. 2 with seat body 24 in a forward position and with seatback 28 folded over onto seat bottom 26. In some embodiments, when seat back 28 is folded over seat bottom 26, a rear portion of seat back 28 may be generally level with cargo floor surface 54 to provide a generally continuous extension of cargo floor surface 54. This configuration may be advantageous for carrying long items of cargo that do not fit completely within a designated cargo area of vehicle 20 when seat back 28 is upright and which does not require more vertical cargo space than the vertical space that is provided between cargo floor surface 54 and ceiling 56 (see FIG. 1).

FIG. 4 is a fragmentary perspective view of the interior of vehicle 20 of FIG. 1 illustrating folding seat assembly 22 of FIG. 3 with seat body 24 in an intermediate position. While in the intermediate position, each latch 46 engages with a corresponding latch engaging feature 58 (see FIG. 3). These components cooperate to support seat body 24 in a generally upright position. To move seat body 24 from the intermediate position, an operator need only actuate one or both actuators 50 and then push seat body 24 in the desired direction. Configuring folding seat assembly 22 with seat body 24 in the intermediate position provides a greater amount of vertical cargo storage space than that which is provided by the configuration shown in FIG. 3, and it does so without any significant intrusion upon the cargo area behind folding seat assembly 22.

FIG. 5 is a fragmentary perspective view of the interior of the vehicle of FIG. 1 illustrating the folding seat assembly of FIG. 4 with seat body 24 in the storage position. This configuration provides a maximum amount of cargo storage space in the second row seating area. In some embodiments, hinge 32 may be configured to position seat back 28 such that a rear surface of seat back 28 is generally level with cargo floor surface 54 when seat back 28 is in the storage position.

Figure 6:
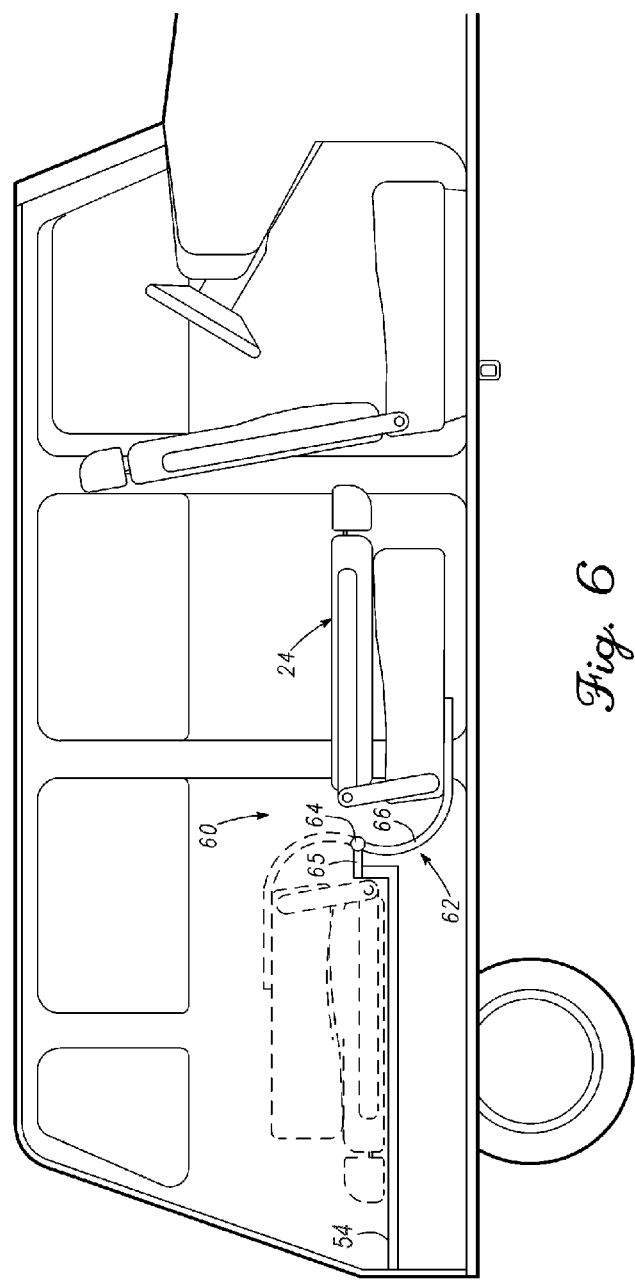
FIG. 6 is a schematic side view illustrating the interior of the vehicle of FIG. 1 equipped with an alternate embodiment of the folding seat assembly.

FIG. 6 is a schematic side view illustrating the interior of vehicle 20 of FIG. 1 equipped with an alternate embodiment of a folding seat assembly 60. Folding seat assembly 60 is very similar to folding seat assembly 22 of FIGS. 1-5, the primary difference being that folding seat assembly 60 employs a hinge 62 which differs from hinge 32. Hinge 62 includes a pivot member 64, a mounting member 65, and an arm member 66. In the illustrated embodiment, mounting member 65 is attached to cargo floor surface 54. In other embodiments, mounting member 65 may be configured to be mounted to cross member 34 or to some other component, including a structural component of the unibody structure of vehicle 20.

Pivot member 64 permits arm member 66 to pivot with respect to mounting member 65. Arm member 66 has a curved cross-section that is configured to support seat body 24 in a spaced apart relationship with respect to pivot member 64. Accordingly, hinge 62 permits seat body 24 to rotate longitudinally between the forward position, shown in solid lines, and the storage position, shown in phantom lines.

Figure 7:
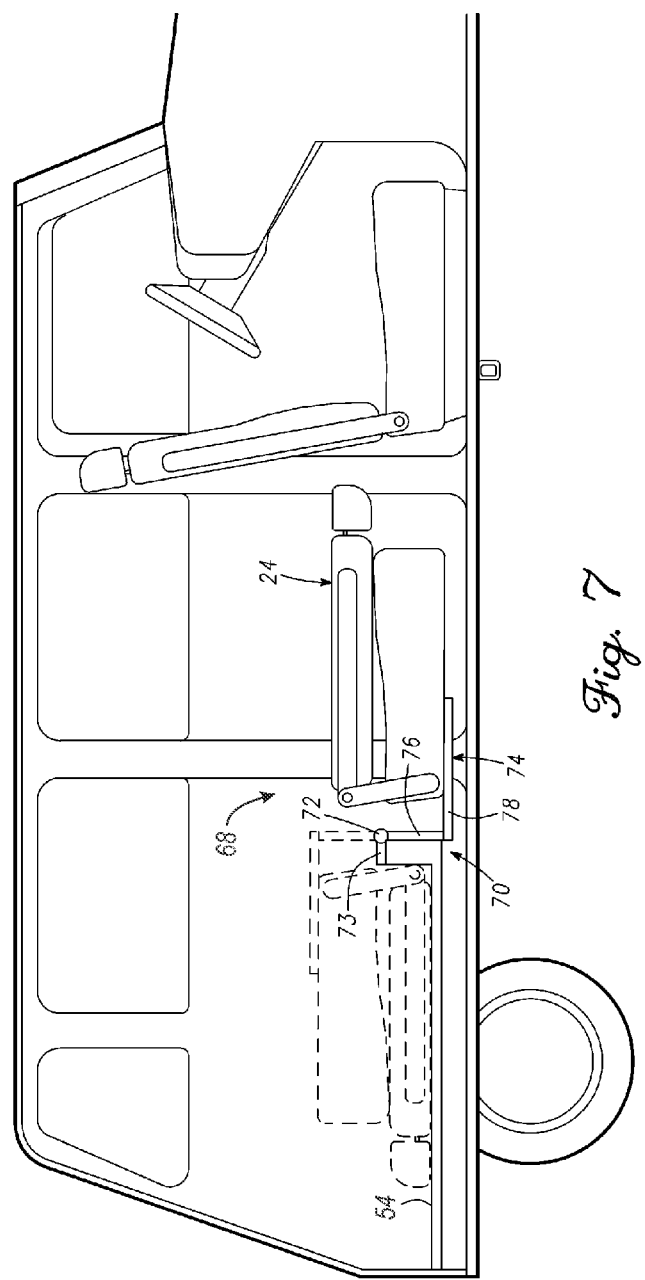
FIG. 7 is a schematic side view illustrating the interior of the vehicle of FIG. 1 equipped with yet another embodiment of the folding seat assembly.

FIG. 7 is a schematic side view illustrating the interior of vehicle 20 of FIG. 1 equipped with yet another embodiment of a folding seat assembly 68. Folding seat assembly 68 is nearly identical to folding seat assembly 60 of FIG. 6, except that folding seat assembly 68 employs a hinge 70 which differs from hinge 62. Hinge 70 includes a pivot member 72, a mounting member 73, and an arm member 74 having a first portion 76 and a second portion 78. First portion 76 and second portion 78 are rigidly joined to one another and are arranged substantially perpendicularly with respect to one another. In the illustrated embodiment, mounting member 73 is attached to cargo floor surface 54. In other embodiments, mounting member 73 may be configured to be mounted to cross member 34 or to some other component, including a structural component of the unibody structure of vehicle 20.

Pivot member 72 permits arm member 74 to pivot with respect to mounting member 73. First portion 76 and second portion 78 are configured to support seat body 24 in a spaced apart relationship with respect to pivot member 72. Accordingly, hinge 70 permits seat body 24 to rotate longitudinally between the forward position, shown in solid lines, and the storage position, shown in phantom lines. A wide variety of other hinge configurations are also possible.

Figure 8:
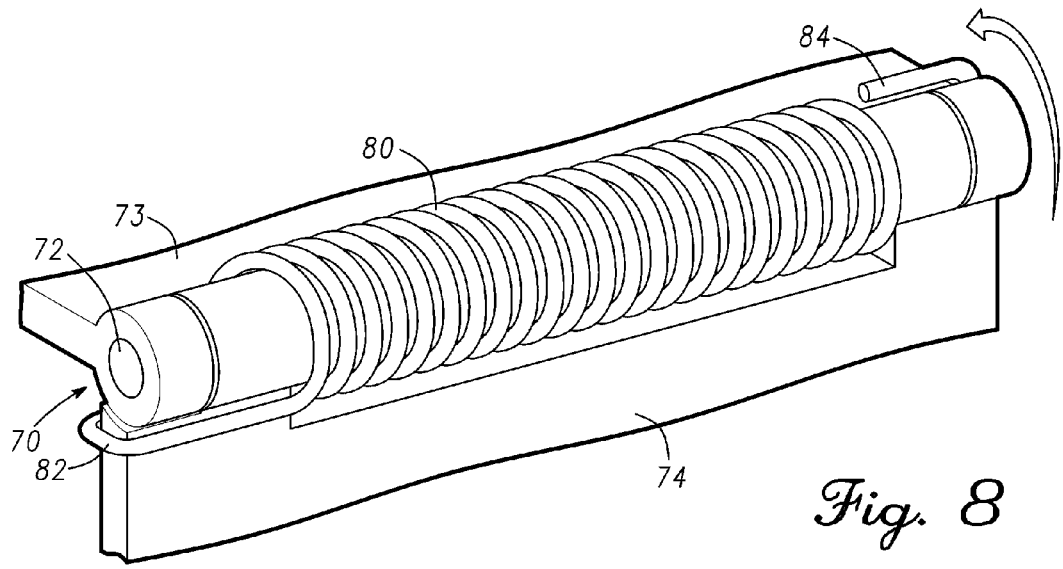
FIG. 8 is a fragmentary perspective view illustrating a hinge and a spring attached to the folding seat assembly of the present disclosure while the seat body is in the forward position.

FIG. 8 is a fragmentary perspective view illustrating hinge 70 and a biasing member or spring 80 attached to the folding seat assembly of the present disclosure while the seat body is in the forward position. In the illustrated embodiment, spring 80 is a torsion spring that is arranged coaxially with pivot member 72. Spring 80 is secured at a first end 82 to arm member 74 and at a second end 84 to mounting member 73. Spring 80 is configured to store energy in a manner that permits it to apply a biasing force or torque that urges arm member 74 and mounting member 73 to rotate with respect to one another. Because mounting member 73 is stationary with respect to vehicle 20, only arm member 74 will move under the torque exerted by spring 80.

Spring 80 is mounted to hinge 70 such that when the seat body is in the forward position, spring 80 exerts a torque on arm member 74 that urges arm member 74 towards the storage position. This torque will assist an operator who is attempting to lift/and or move the seat body from the forward position to another position.

Figure 9:
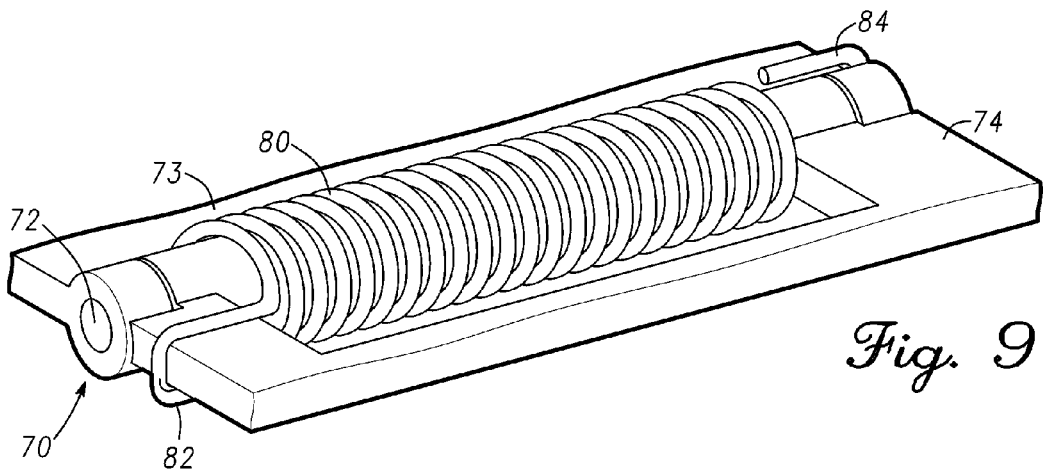
FIG. 9 is a fragmentary perspective view illustrating the hinge and the spring of FIG. 8 when the seat body is in the intermediate position.

FIG. 9 is a fragmentary perspective view illustrating hinge 70 and spring 80 of FIG. 8 when the seat body is in the intermediate position. Spring 80 is mounted to hinge 70 in a manner that causes spring 80 to store no energy when the seat body is positioned in the intermediate position and therefore to provide no bias and to exert no torque on arm member 74. Instead, when the seat body is in the generally upright, intermediate position, gravity will assist an operator in moving the seat body from the intermediate position.

Once the seat body is moved from the intermediate position towards the storage position, spring 80 begins to store energy in a manner that produces a torque that opposes the movement of the seat body towards the storage position. This torque builds as the seat body approaches the storage position and serves to dampen the rotational motion of the seat body. This dampening effect will diminish the rate of rotation of the seat body as it moves towards the storage position, thus cushioning the impact when the seat body reaches the storage position.

Figure 10:
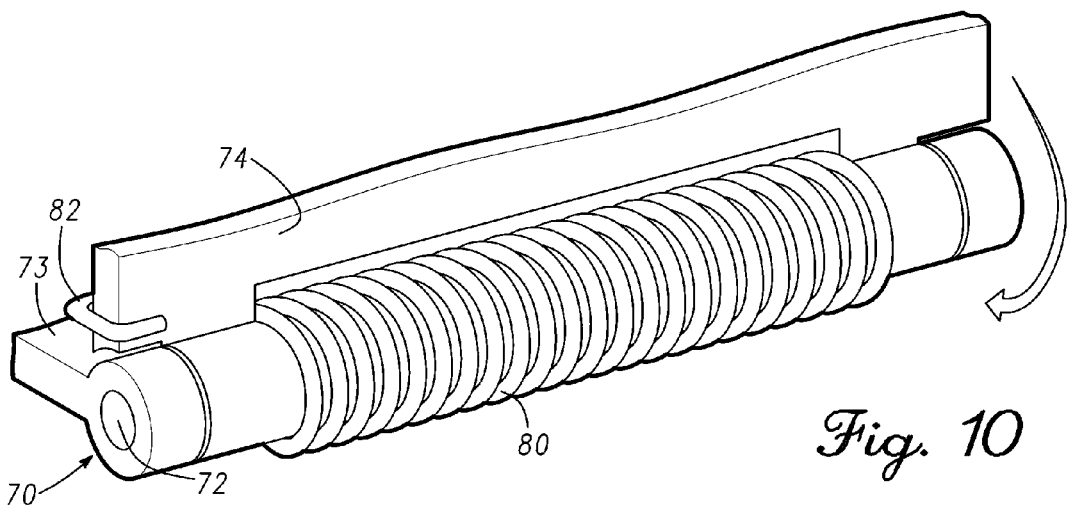
FIG. 10 is a fragmentary perspective view illustrating the hinge and the spring of FIG. 8 when the seat body is in the storage position.

FIG. 10 is a fragmentary perspective view illustrating hinge 70 and spring 80 of FIG. 8 when the seat body is in the storage position. When the seat body is in the storage position, spring 80 is storing energy and will urge arm member 74 towards the forward position. Accordingly, when the seat body is in the storage position, spring 80 is configured to assist an operator in lifting and moving the seat body out of the storage position.

Figure 11:
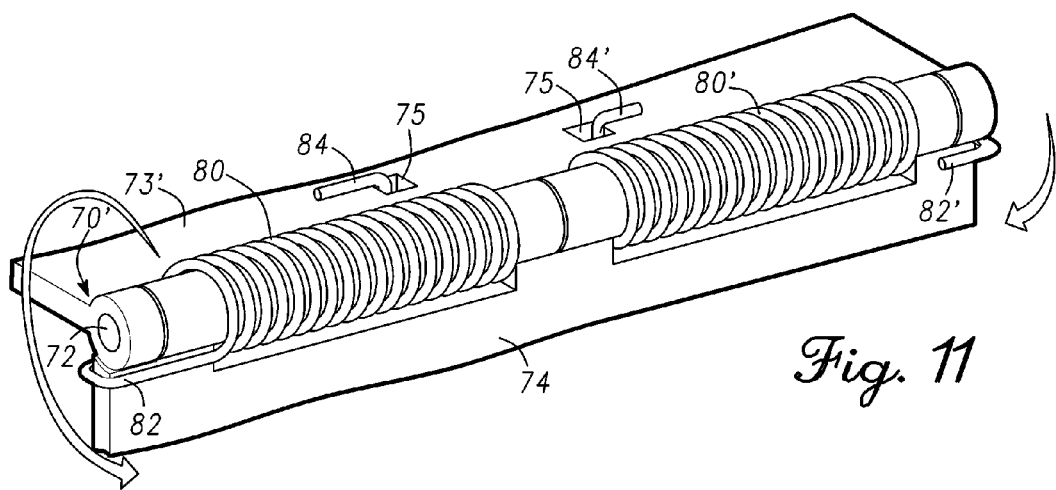
FIG. 11 is a fragmentary perspective view illustrating a hinge, a first spring and a second spring attached to the folding seat assembly while the seat body is in the forward position.

FIG. 11 is a fragmentary perspective view illustrating a hinge 70', a first spring 80 and a second spring 80' attached to the folding seat assembly of the present disclosure while the seat body is in the forward position. Hinge 70' includes a mounting member 73' that includes two openings 75 to permit the attachment of the respective second ends 84 and 84' of springs 80 and 80'. Spring 80 and 80' are each further connected to arm member 74 at their respective first ends 82 and 82'. Spring 80 is configured to exert a first biasing force or torque and spring 80' is configured to exert a second biasing force or torque in a direction opposite to the torque exerted by spring 80. In the illustrated embodiment, spring 80 is configured to exert torque on arm member 74 in a manner that urges arm member 74 towards the storage position while spring 80' is configured to exert torque on arm member 74 in a manner that urges arm member 74 towards the forward position.

The springs 80 and 80' are further configured such, when the seat body is in the forward position, spring 80 exerts a torque on arm member 74 towards the storage position that exceeds the torque exerted by spring 80' towards the forward position. Thus, the net effect of springs 80 and 80' is to urge arm member 74 towards the storage position which assists an operator in lifting and moving the seat body out of the forward position.

Figure 12:
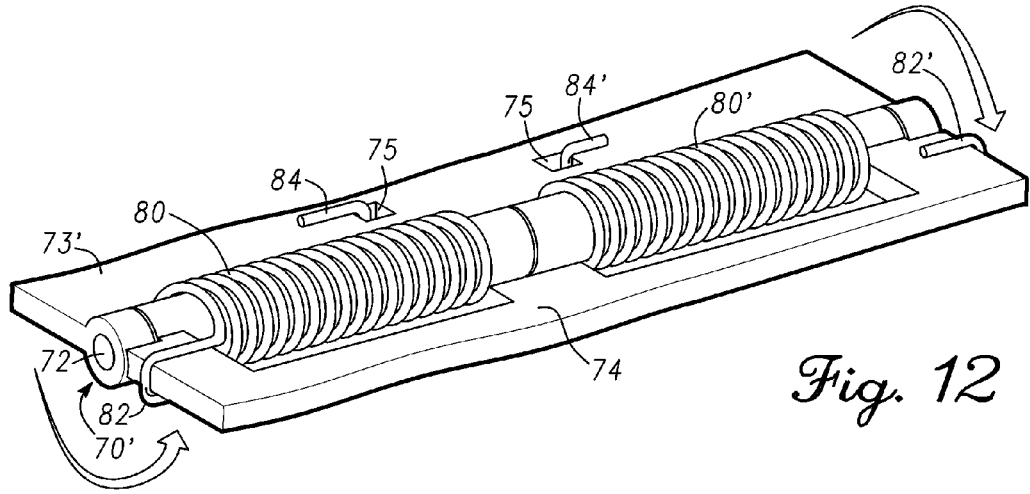
FIG. 12 is a fragmentary perspective view illustrating the hinge, the first spring, and the second spring of FIG. 11 when the seat body is in the intermediate position.

FIG. 12 is a fragmentary perspective view illustrating hinge 70', first spring 80, and second spring 80' of FIG. 11 when the seat body is in the intermediate position. When in the intermediate position, the countervailing torques of springs 80 and 80' are approximately equal and thus the net effect of the two springs is neutral. From the intermediate position, gravity will assist an operator in moving the seat body either towards the storage position or towards the forward position.

Figure 13:
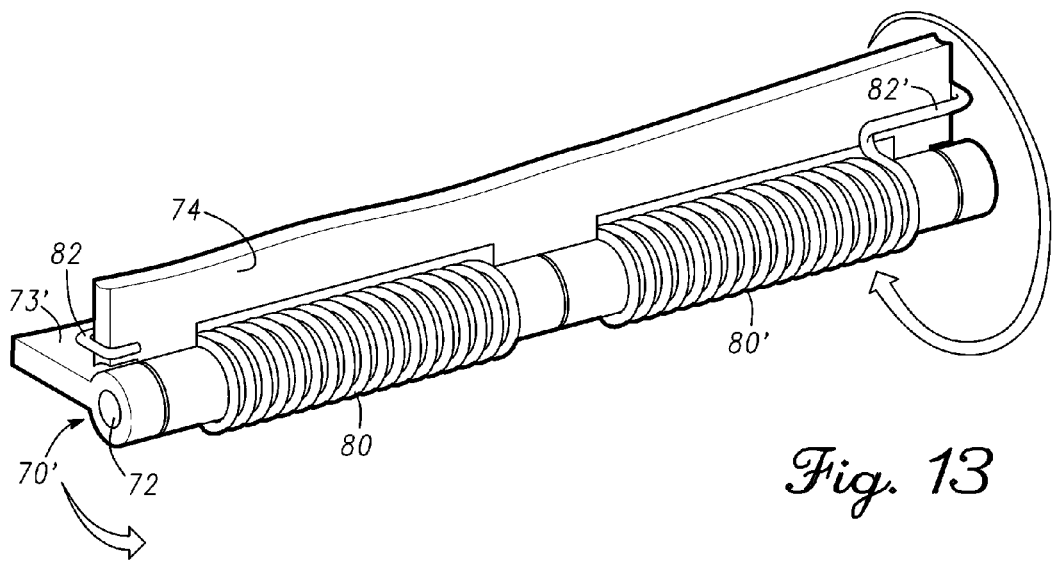
FIG. 13 is a fragmentary perspective view illustrating the hinge, the first spring, and the second spring of FIG. 11 when the seat body is in the storage position.

FIG. 13 is a fragmentary perspective view illustrating hinge 70', first spring 80, and second spring 80' of FIG. 11 when the seat body is in the storage position. In this position, the torque exerted by spring 80' on arm member 74 towards the forward position exceeds the torque exerted by spring 80 towards the storage position. Accordingly, the net effect of the two springs is to urge the seat body towards the forward position and will thus assist an operator as the seat body moves from the storage position towards the intermediate position.

In other embodiments, when attached to hinge 70', springs 80 and 80' may be configured such that spring 80 urges the seat body towards the storage position when the seat body is in the forward position, spring 80' urges the seat body towards the forward position when the seat body is in the storage position, and each spring exerts no torque when the seat body is in the intermediate position. This configuration would allow each spring to assist the other in urging the seat body towards either the forward position or the storage position and would further allow each spring to act as a damper once the seat body moves past the intermediate position.

Although the embodiments illustrated in FIGS. 8-13 included the use of coil springs, in other embodiments, other types of springs may be employed together with hinge 70, including any type of spring that is effective to apply a torque force to seat body 24. In still other embodiments, spring 80 may be attached to other portions of folding seat assembly 68. In yet other embodiments, other types of biasing members, including biasing members configured to apply compressive or tension forces may also be employed without departing from the teachings of the present disclosure.

Although the embodiments illustrated in FIGS. 8-13 featured springs 80 and 80' for use with hinges 70 and 70', respectively, it should be understood that such springs may also be utilized with a dual pivot hinge such as hinge 32 (see FIGS. 1-5). In such an application, first and second pivot members 42 and 44 could each be fitted with one or more biasing members such as springs 80 and 80' to facilitate movement from, and to dampen movement towards, the forward position and/or the storage position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof

What is claimed is:

1. A folding seat system for use with a vehicle, the folding seat system comprising:
    a seat body including a seat bottom and a seat back, the seat back being rotatably mounted to the seat bottom such that the seat back can be folded over the seat bottom;
    a hinge connected to the seat body and configured for attachment to the vehicle, the hinge further configured to permit the seat body to rotate between a forward position and a storage position when the seat back is folded over the seat bottom and when the hinge is attached to the vehicle, such rotation being approximately one hundred and eighty degrees in a longitudinal direction of the vehicle; and
    a first biasing member arranged to act on one of the seat body and the hinge, the first biasing member configured to bias the seat body towards the storage position when the seat body is in the forward position,
    wherein the seat body is further configured to be selectively secured in an intermediate position between the forward position and the storage position, the intermediate position being generally upright, and
    wherein the seat body further includes a latch configured to engage a latch engaging feature on the vehicle, the latch being disposed proximate the latch engaging feature when the seat body is in the intermediate position.

2. The folding seat system of claim 1, wherein the hinge comprises a dual pivot hinge.

3. The folding seat system of claim 1, wherein the first biasing member is further configured to bias the seat body towards the forward position when the seat body is in the storage position.

4. The folding seat system of claim 3, wherein the first biasing member is configured to provide no bias to the seat body when the seat body is in the intermediate position.

5. The folding seat system of claim 1, further comprising a second biasing member arranged to act on one of the seat body and the hinge, the second biasing member configured to bias the seat body towards the forward position when the seat body is in the storage position.

6. The folding seat system of claim 5, wherein a biasing force exerted by the first biasing member towards the storage position is substantially equal to a second biasing force exerted by the second biasing member towards the forward position when the seat body is in the intermediate position.

7. The folding seat system of claim 1, wherein the first biasing member comprises a spring.

8. The folding seat system of claim 7, wherein the spring comprises a torsion spring.

9. A folding seat system for use with a vehicle, the folding seat system comprising:
   a seat body including a seat bottom and a seat back, the seat back being rotatably mounted to the seat bottom such that the seat back can be folded over the seat bottom;
   a hinge connected to the seat body and configured for attachment to the vehicle, the hinge further configured to permit the seat body to rotate between a forward position and a storage position when the seat back is folded over the seat bottom and when the hinge is attached to the vehicle, such rotation being approximately one hundred and eighty degrees in a longitudinal direction of the vehicle, the hinge having a fixed pivot point disposed at an elevation substantially higher than a point of support of the seat bottom when the seat body is in the forward position and the fixed pivot point being disposed at an elevation substantially lower than an underside of the seat bottom when the seat body is in the storage position; and
   a biasing member arranged to act on one of the seat body and the hinge, the biasing member configured to bias the seat body towards the storage position when the seat body is in the forward position.

10. The folding seat system of claim 9, wherein the biasing member is further configured to bias the seat body towards the forward position when the seat body is in the storage position.

11. The folding seat system of claim 9, wherein the hinge comprises a dual pivot hinge.

12. The folding seat system of claim 9, wherein the biasing member comprises a spring.

13. The folding seat system of claim 12, wherein the spring comprises a torsion spring.

14. The folding seat system of claim 9, further comprising an arm member connecting the seat body to the hinge, the arm member being configured to support the seat body in a spaced apart relationship with the hinge.

15. The folding seat system of claim 14, wherein the arm member has a curved cross-section.

16. The folding seat system of claim 14, wherein the arm member includes a first portion and a second portion, the second portion being generally transverse to the first portion.

17. A vehicle having a folding seat system, the vehicle comprising:
   a support body;
   a seat body including a seat bottom and a seat back, the seat back being rotatably mounted to the seat bottom such that the seat back can be folded over the seat bottom;
   a hinge attached to the support body and to the seat body, the hinge configured to permit the seat body to rotate between a forward position and a storage position when the seat back is folded over the seat bottom, such rotation being approximately one hundred and eighty degrees in a longitudinal direction of the vehicle, the hinge having a fixed pivot point disposed at an elevation substantially higher than a point of support of the seat bottom when the seat body is in the forward position and the fixed pivot point being disposed at an elevation substantially lower than an underside of the seat bottom when the seat body is in the storage position;
   a biasing member arranged to act on one of the seat body and the hinge, the biasing member configured to bias the seat body towards the storage position when the seat body is in the forward position.

18. The vehicle of claim 17, wherein the support body comprises a cross member of a unibody structure.

19. The vehicle of claim 17, wherein the biasing member comprises a spring and wherein the hinge comprises a dual pivot hinge.

* * * * *